United States Patent [19]

Fox

[11] Patent Number: 4,741,497
[45] Date of Patent: May 3, 1988

[54] GRADUATED AIRCRAFT DESIGN AND CONSTRUCTION METHOD

[75] Inventor: William W. Fox, San Diego, Calif.

[73] Assignee: Fox Brothers Limited Partnership, San Diego, Calif.

[21] Appl. No.: 879,485

[22] Filed: Jun. 27, 1986

Related U.S. Application Data

[63] Continuation-in-part of Ser. No. 674,407, Nov. 23, 1984, abandoned.

[51] Int. Cl.$^4$ .......................... B64C 1/00; B64C 3/00
[52] U.S. Cl. .............................. 244/117 R; 244/123; 244/119
[58] Field of Search ...................... 244/45 A, 120, 123, 244/124, 117 R, 133, 36, 218, 119; 29/401.1; 249/155–159, 49; 114/355, 357, 77 A, 77 R; 425/DIG. 14; 268/328.7, 257; 33/12

[56] References Cited

U.S. PATENT DOCUMENTS

D. 202,840  11/1965  Olson ................................. 244/218
3,942,746   3/1976   Carter et al. ......................... 244/36

OTHER PUBLICATIONS

"Tower Hobbies", Radio Control Models Catalogue, Champaign, Ill., 1984.

*Primary Examiner*—Joseph F. Peters, Jr.
*Assistant Examiner*—Rodney Corl
*Attorney, Agent, or Firm*—Charmasson & Holz

[57] ABSTRACT

A design and construction method, for a graduated series of aircraft of various sizes, in which development costs are minimized by maintaining a consistent scale configuration from model to model, and production costs are minimized through the use of a universal tooling concept for the manufacturing of detail parts, subassemblies and components of the airframes. For each model (M11, M12 . . . M1n) of a series size-graduated elements such as the main wing airfoils (31, 32, 33) are designed with similar characteristics and overlapping dimensions. A common set of tools for constructing these elements is built to accommodate the largest dimension, such as the root cord (34) of the largest airfoil (31) down to the smallest dimension, such as the tip cord (35) of the smallest airfoil (33). The maintaining of a consistent geometric-scaled relationship between the wing, horizontal and vertical airfoils of the various models for a specific manufacturer's size-graduated series of aircraft and the maintenance of the structural bending and torsional stiffness coefficients consistent from model to model provides for consistant flying qualities and performance characteristics assuming that the thrust to weight ratios are also maintained constant from one model to another throughout a specific manufacturer's size-graduated series of aircraft. The universal tooling concept provides for a set of tooling to be used by a specific manufacturer for the making of all of the detail parts and the assembly of these parts, materials and components into completed airframes for each model in a specific manufacturer's size-graduated series of aircraft.

12 Claims, 6 Drawing Sheets

GRADUATED AIRCRAFT DESIGN AND CONSTRUCTION METHOD

PRIOR APPLICATION

This is a Continuation-in-part of Application Ser. No. 674,407 filed on Nov. 23, 1984, now abandoned.

FIELD OF THE INVENTION

The present invention relates to design and construction methods for aircraft, and especially to those aimed at building a size-graduated series of aircraft having a consistent scale relationship between aircraft of different sizes resulting in a minimum of development and production costs.

BACKGROUND OF THE INVENTION

The numerous models offered in the civil aviation market by the various manufacturers have traditionally been point designs, with a wide variety of engine, avionics and equipment options offered around a given airframe that have remained in production for many years with little or no technological improvement. This traditional design approach has required an extensive, hence costly, development and certification program to eliminate flaws from a given design in order to assure its airworthiness as required by the FAA rules and regulations. The point design approach for each model in a product line of civil aviation aircraft also requires a completely unique set of production tooling for the manufacture of each specific model, allowing the manufacturer little opportunity to reduce manufacturing costs through the partial or complete reuse of molds, jigs, templates or other tooling in the manufacture of other models of different size within his product line.

Other than in the field of avionics, the past forty years have seen precious little new technology applied to the design, safety and manufacture of civil aviation aircraft. Although the use of composite materials is revolutionizing the single-point design and construction of military and homebuilt aircraft, civil aviation prices continue to escalate and the number of aircraft sold continues to drop, the future of civil aviation manufacturing remains disquietingly uncertain. A technological revolution in the design and manufacture of civil aviation aircraft could dispel that gloom.

A search by the applicant reveals no relevant prior art within the field of aviation related to the present invention.

SUMMARY OF THE INVENTON

The first objective of the present invention is to reduce aircraft development and certification costs by utilizing a graduated aircraft design approach to produce a series of individual point designs for a wide variety of different size aircraft that all look alike, fly alike and perform alike because each model is a scale equivalent of other models in the series with respect to airfoil shape and configuration. Models of a series utilize unique cabin arrangements and propulsion systems selected to match the specific mission requirements for each particular model.

The second objective of the invention is to reduce aircraft manufacturing costs by the utilization of a universal tooling concept wherein the airframe parts, materials and components can be made and assembled into a completed airframe for each model in the size-graduated series of aircraft from one set of tooling.

DESCRIPTION OF THE PREFERRED EMBODIMENT OF THE INVENTION

Figures 1, 5A, 5B, 5C, 5D:
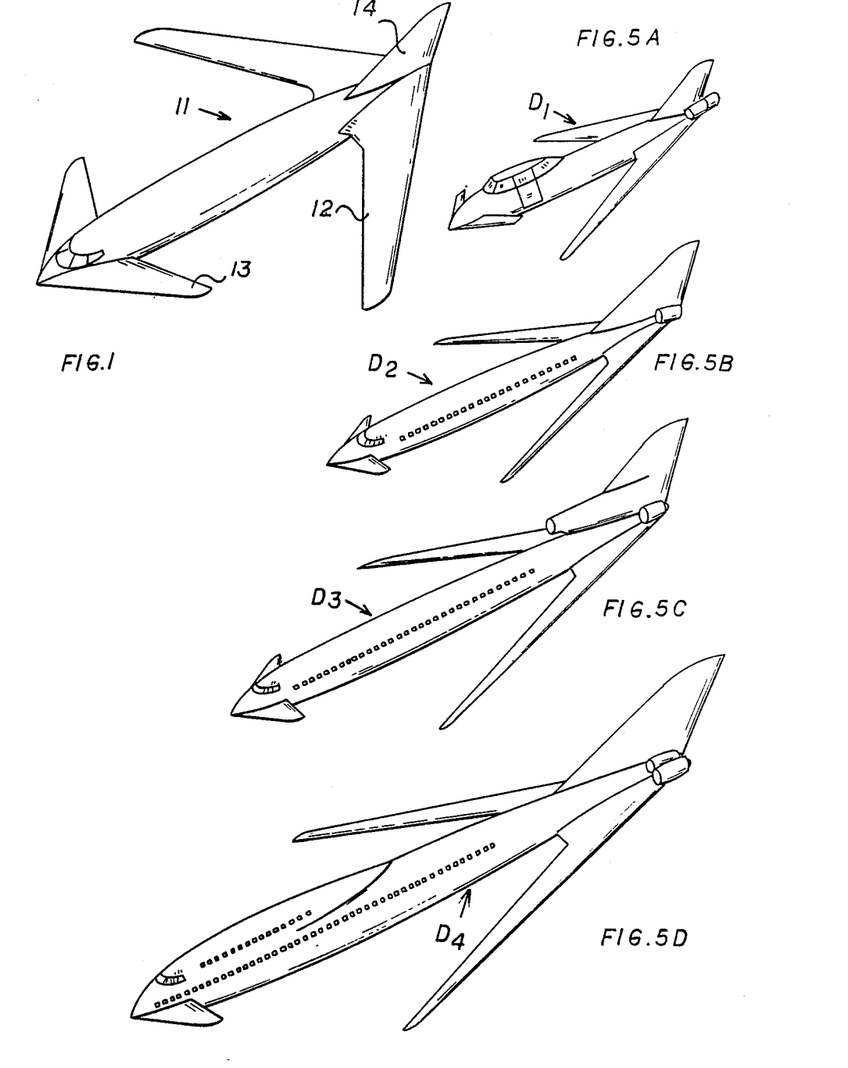
FIG. 1 is a perspective view of a forward-swept wing airframe.
FIGS. 5A through 5D illustrates various airframe designs built according to the invention.

FIG. 1 illustrates a "High-Tech" airframe design 11 of the future with a forward-swept wing 12, a nose-mounted airfoil or canard 13 and conventional vertical airfoil 14 which is currently being flight-tested as a Research and Development Fighter Model for the U.S. government.

This advanced "High-Tech" configuration of the future has been chosen for use as the preferred embodiment of the instant invention because of its overall advantages as described herein. However, the application of the instant invention is in no way dependent upon the illustration configuration.

Figures 2A, 2B:
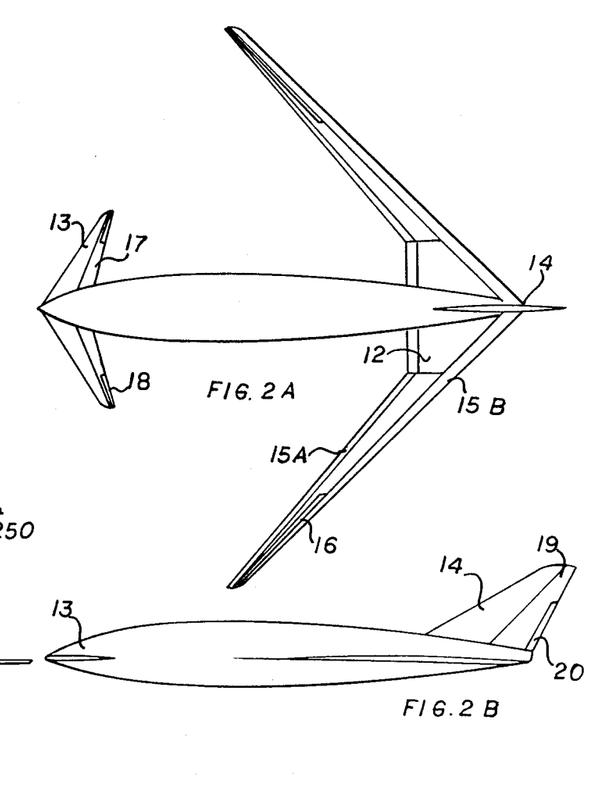
FIG. 2A is a top plan view of an airframe according to the invention.
FIG. 2B is a side elevated view thereof.
Figures 2C, 3:
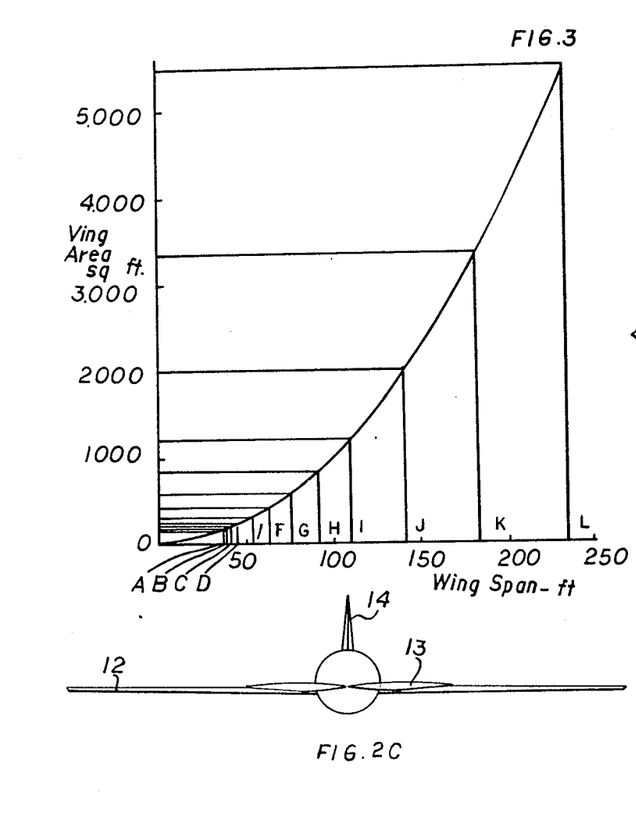
FIG. 2C is a front elevational view thereof.
FIG. 3 is a graph of the wing area vs. wing span for various airframe models.

The ideal configuration of FIG. 2, characterized by an aft-fuselage-mounted forward-swept wing 12, an aft-swept, forward-mounted horizontal airfoil (canard) 13 and vertical airfoil 14 allows full implementation of the graduated design and construction techniques which comprise the instant invention. In addition, there are several aerodynamic and safety advantages which are inherent in this configuration.

First, the forward-swept wing has several aerodynamic advantages well-known in the art. Adverse yaw while banking, as well as the tendency to roll while side-slipping are both greatly reduced or altogether eliminated.

Second, the forward-swept wing combined with aft-mounted power make possible the exclusion of all fuel and fuel lines from the crew and passenger areas of the fuselage envelope.

Third, it is well known in the art that canards (lifting surfaces mounted forward of the main wing) offer significant advantages over aft-mounted horizontal stabilizers. A canard horizontal airfoil contributes to an aircraft's lift system while a conventional horizontal airfoil subtracts from an aircraft's lift system. The canard 13 will eliminate "deep stall" problems because it is never in the wake of the main wing airfoil. At high angles of attack, the canard creates high-energy vortices that wash over the center section of the main wing, delaying boundary separation in airflow over that section, therefore delaying a stall of that section.

Additionally, if the canard's fixed angle of attack is greater than that of the aft-mounted wing, the canard will stall first, causing the nose of the aircraft to drop before the aft-mounted wing reaches its critical angle of attack. Since low altitude stalls are the single largest cause of fatal civil aviation crashes, an aircraft utilizing a canard-type horizontal surface offers an important safety advantage over the aircraft of conventional design.

Fourth, the ideal configuration of FIG. 2 is especially suited for far-aft-mounted engines, with maximum safety in the event of a powerplant-related fire, since flames and other hot gasses cannot impinge directly on the primary aircraft structure, but are dissipated in the free airstream.

The forward-swept, aft-mounted wing 12 of the ideal configuration of FIG. 2 can accommodate leading edge flaps or slats 15A and full-span flaps 15B to improve the coefficient of lift for shorter takeoff and landing characteristics if the mission requirements of a specific model so dictate. Lateral control can be achieved through the use of spoilers 16, conventional ailerons not shown, or by differential use of the wing flaps 15B.

The canard airfoil 13, mounted on the forward fuselage, provides the necessary longitudinal stability and control. Longitudinal control can be obtained by means of conventional elevator 17 or by movement of the entire surface 13, 17 and 18 as a slab. Longitudinal trim can be achieved by means of a conventional trim tab 18 or by trimming the stabilizer surface 13, 17 and 18.

The vertical airfoil 14 mounted on the aft-end of the fuselage provides the necessary directional stability and control. Directional control is achieved through the use of a conventional rudder 19 and directional trim is achieved by means of a conventional trim tab 20.

The size-graduated design method is illustrated in FIG. 3 with a graph of wing area vs. wing span for an aspect of ten. Points A through D represent conceptual wing areas and wing spans for single-engine models of two, four, six and eight-place capacity, respectively. Points E through H represent conceptual wing areas and wing spans for twin-engine models of six to ten, eighteen, thirty-three and fifty-six-place capacity, respectively. Points I through L represent conceptual wing areas and wing spans for multi-engine models of one hundred eight, one hundred sixty-one, two hundred fifty-six and five hundred fifty-place capacity respectively.

As heretofore stated, the high-aspect-ratio, forward-swept main wing 12 must be constructed of "state-of-the-art" composite materials. However, construction of the entire aircraft from composite materials offers the advantages of greatly reduced weight and drag as compared to a conventionally constructed aircraft of comparable size utilizing aluminum structure. The inherent high strength per unit of weight for composite materials permits the construction of a "high-G", crash-resistant, cabin structure for improved crash-worthiness without an excessive weight penalty. Additional reinforcement would always be added to the structural elements of the airframes in the area of increased stress as they increase in size.

Figure 4:
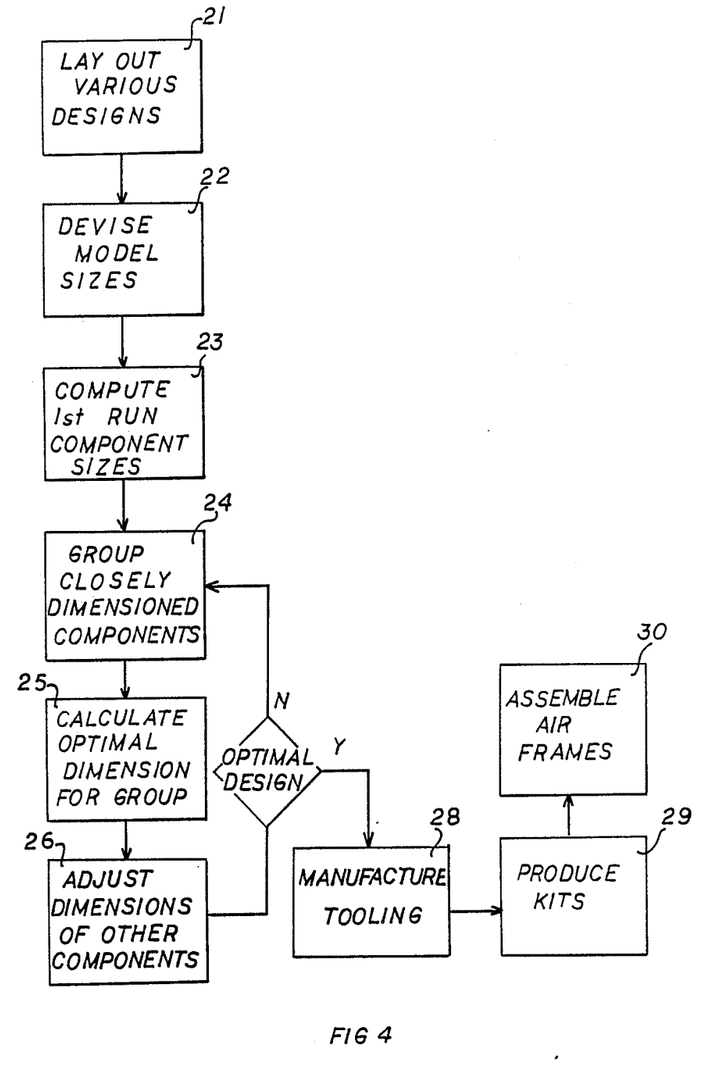
FIG. 4 is a general flow diagram of the claimed process.

The main steps in the design and construction of sizegraduated airframes are illustrated in the block diagram of FIG. 4. The process begins with the lay-out 21 of various airframe designs such as the designs illustrated in FIG. 5. One should note that although the four designs are quite different in terms of size, propulsion system and general purpose, they all adopt the basic features illustrated in FIGS. 1 and 2.

FIG. 5A shows a single-engine aircraft design for military or general aviation. FIGS. 5B through 5D show various designs of multi-engine aircrafts comparable in size and capacity up to the largest airliners presently in use.

For each design $D_1$, $D_2$ ... $D_n$, a series of size-graduated but otherwise identical models $M_{11}$, $M_{12}$ ... $M_{1n}$; $M_{21}$, $M_{22}$, ... $M_{2n}$; $M_{n1}$, $M_{n2}$ ... $M_{nn}$ are devised 22.

Figures 6, 7, 8:
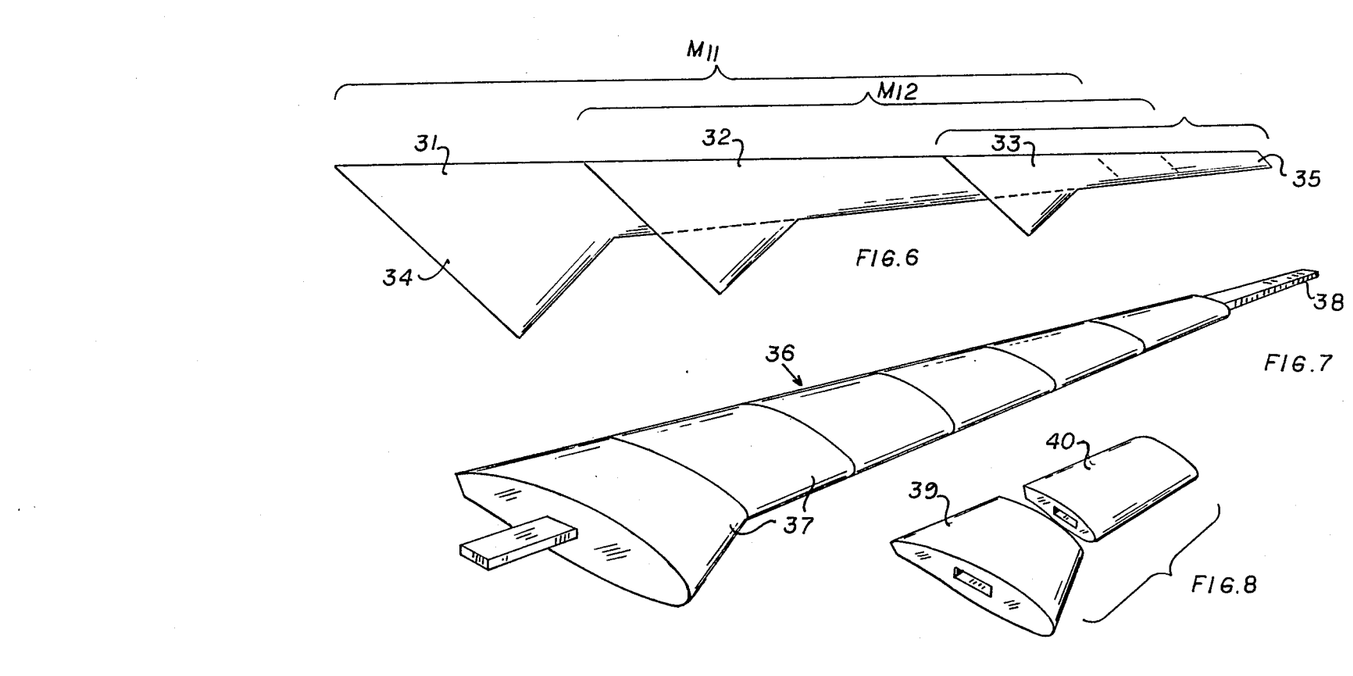
FIG. 6 is a top-plan view of various superimposed airfoils of the same design.
FIG. 7 is a perspective view of an airfoil mandrel.
FIG. 8 is a perspective view of mandrel elements.

In determining the dimensions of the various components of each model, the design team can take maximum advantage of the time-and-material savings offered by the method. Let us, for example, consider the design and fabrication of the main wing airfoil 12 for a series of models $M_{11}$, $M_{12}$ ... $M_{1n}$ for airframe design $D_1$. In FIG. 6 the airfoils 31, 32 and 33 for the two largest models $M_{11}$ and $M_{12}$ and for the smallest model $M_{1n}$ of this particular design are shown superimposed in top plan view, in order to illustrate the size overlaps between the three airfoils. This graduate scale construction method applies to any tapered surface, without regard to its swept angle.

The size overlap allows for the manufacture of universal tooling which can be used over the whole spectrum of sizegraduated models. This requires that the universal tooling be able to accommodate the root cord 34 of the largest airfoil 31 as well as the tip cord 35 of the smallest one 33.

Such tooling is particularly efficient in cases where the plan forms, profiles and general arrangements of the airfoils are exact scaled versions from one model to another. A tool common to all models may be provided with both fixed and incrementally variable dimensions or with stop points as determined by the detail designs of each specific model.

An example of a part of such tooling is shown in FIG. 7 in the form of a mandrel 36. The mandrel 36 is made from a series of elements 37 of various shapes and sizes which can be strung or daisy-chained on a shaft 38 to create a form suitable for molding the outer skin panels of the airfoils, 31, 32, 33. The mandrel could also be used as a pattern to cut the sheets of composite material used in the fabrication of the skin panels. FIG. 8 illustrates other size-graduated elements 39, 40 which could be substituted for some of the elements 37 shown assembled in FIG. 7 in order to scale the mandrel to the size corresponding to a smaller model of the series.

Figure 9:
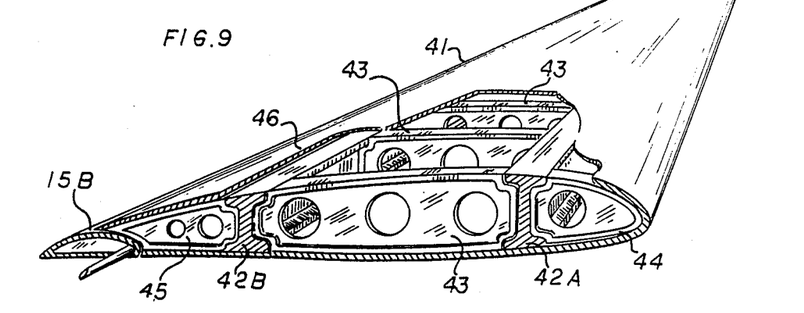
FIG. 9 is a perspective view of a segment of an airfoil with a cut-away section disclosing the internal structure.

FIG. 9 illustrates the internal structure of an airfoil 41 according to state-of-the-art assembly techniques, using components made from composite materials. The longitudinal support is provided by a pair of spars 42A and 42B which are sized and tapered to run the whole length of the airfoil 41. A set of size-graduated ribs or bulkheads 43 are mounted between the spars 42A, 42B to define the airfoil upper and lower profiles. Leading edge ribs 44 and trailing edge ribs 45, similarly size-graduated, prolong the ribs or bulkheads 43 on the outer sides of the spars. The skin panels or shroud 46 is laid over this infrastructure. A flap 15B is shown behind the trailing rib 45.

In view of the size overlap between the airfoils of various models it is conceivable that the dimensions of some of the bulkheads 43, and ribs 44, 45 calculated for use in a particular model will closely correspond to the dimensions of the same component on one or more of the other models. As indicated in FIG. 4, the design team should compute 22 the first run sizes of all the components, then group 23 those components which have close dimensions, and calculate 25 a median or average set of dimensions for a new component which can be substituted for the whole group. It may be necessary to adjust the position or dimensions of some of the other parts in order to accommodate the compromise. For instance, it may be necessary to slightly change the spacing between two bulkheads or shift the position of all bulkheads within the airfoil. Several passes of this iterative process can easily be performed by means of programmable data processors.

In further application of the technique, the spars 42A, 42B may be made by extrusion or forging and machining with numerically-controlled machinery. It will be convenient for the programmers of this machinery to prepare sets of instructions in the form of computer programs or other machine readable devices to cause the manufacture of spars with such characteristics that they can be used in the construction of various models and airframe designs with nominal adjustments. The number and size of dies and molds can therefore be reduced as well as the overall number and sizes of components necessary to assemble the whole series of airframe. Once the necessary tooling has been manufactured 28, kits of components are produced 29.

The sharing of components between airframes simplifies the handling of the inventory and the logistics for the airframe assemblies 30.

The degree of reuseability of the set of universal tooling for airfoil surfaces is dictated by the magnitude of step increases in size from one model to the next. As the length and width of an airfoil increase, required design loads are also increased. To handle the additional forces to which the larger airfoil structure will be subjected to, it will be necessary, in the case of an airfoil manufactured of composite materials, to increase the reinforcing material in the composite matrix. In the case of airfoils manufactured of built-up elements of conventional materials, the cross-sectional area of the load-supporting elements such as spars or stressed skin will require augmentation over the length of the span. The methods and processes discussed in connection with the design and manufacture of airfoils are also applicable to other elements of the airframes. For instance, the belt-frames and bulkheads used in the construction of fuselages can also be shared between various models. Entire complex structures such as nose sections, engine housings, cockpits, cabin sections etc. may be common to various models of the same design.

Figure 10:
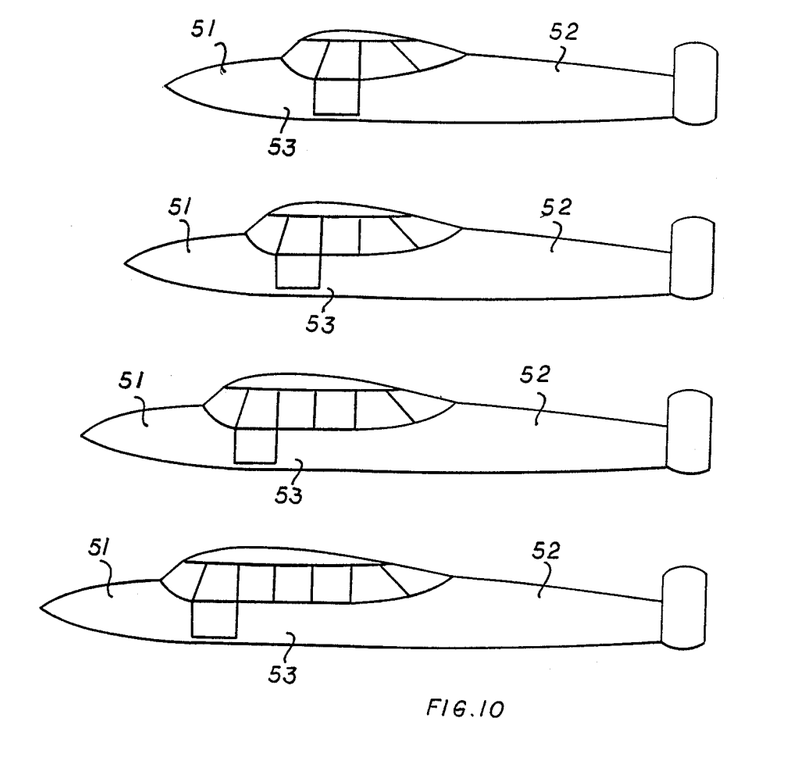
FIG. 10 is a diagramatical view of various size-graduated fuselages.

FIG. 10 depicts a series of models 47, 48, 49 and 50 of the same general designs having a common nose section 51 and a common tail section 52. The cabin sections 53 have a great deal of similarity and only vary significantly in length, therefore can share a majority of the components.

Figure 11:
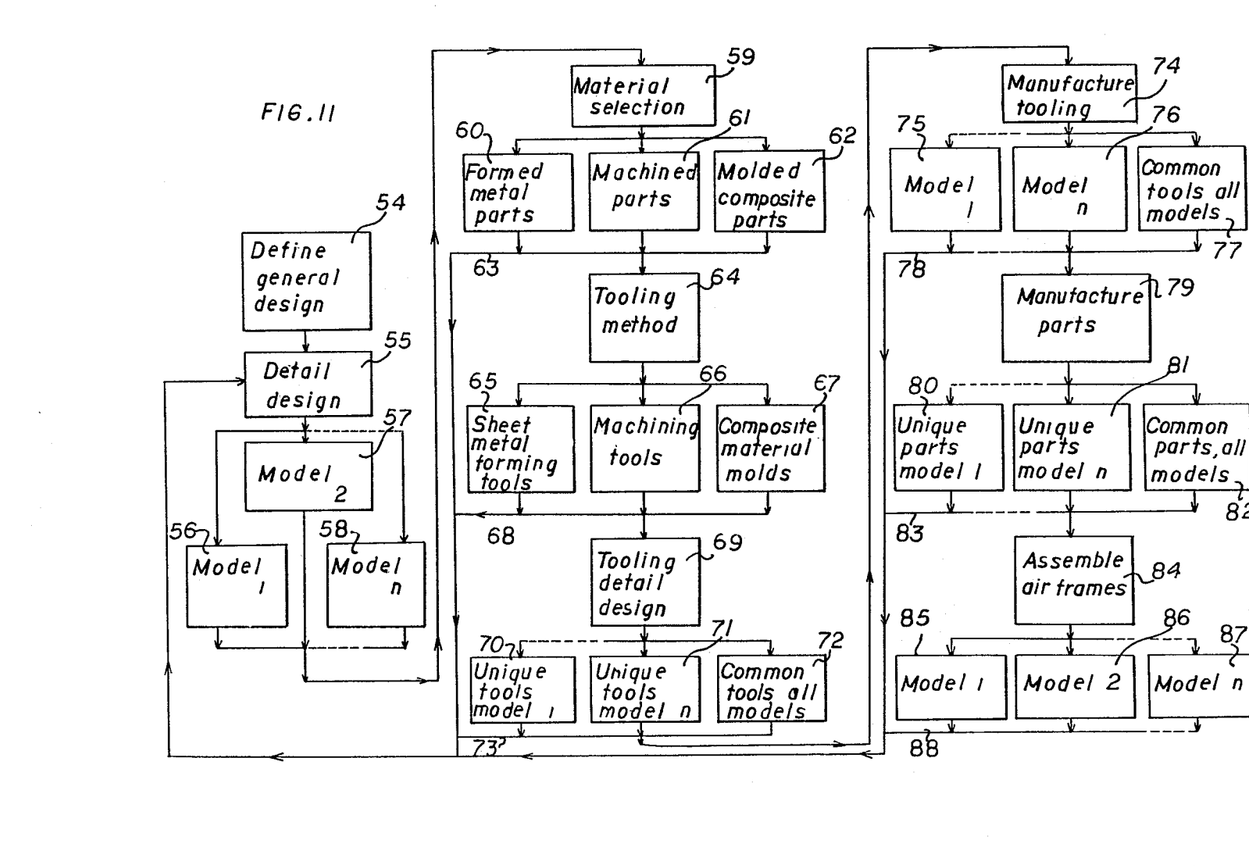
FIG. 11 is a flow diagram of the entire process.

FIG. 11 further illustrates the general methodology of the invention. Once, the general airframe design for a series has been defined, 54 the detailing phase 55 of the process is undertaken. The specific lay-outs are created for each model in the series. These individual lay-outs, model by model, 56, 57 and 58, yield the finite dimensions for each unique part and for each common part for each model in the series. This step also yields the control dimensions for the incrementally variable but overlaping elements of the universal tooling to be utilized to build the aircraft. In a somewhat parallel and overlapping activity, the Material Selection 59 for each detail part 60, 61 and 62 and the Tooling Method 64 for the manufacturing and assembly of all detail parts 65, 66 and 67 are determined for each model in the series.

Steps 55 through 67 are an iterative process that assures the least reasonable cost for each part and each assembly for each model in the series. The feedback loops 63 and 68 are shown following items 60, 61 and 62 and 65, 66 and 67 respectively. The action is accomplished via tradeoff studies to assure that a reasonable optimal cost has been achieved for fabrication of each part and its assembly.

Tooling Detail Design 69 is then accomplished for the unique tools of each model 70 and 71 and for the common tools for all models 72. The variable but overlaping dimensions of these fabrication and assembly tools become finite at this stage of the process. For example, the mold for the composite material skin must have the length and cross section from the airfoil tip cord ($tc_1$) of the smallest airframe to the root cord ($rc_n$) of the largest airframe in the series where the subscript n is the number of specific models in the series.

Sheet metal parts are usually formed on a hydropress, drop hammer or the equivalent. Each part requires a unique set of forming dies. Skins and fairings are usually formed on a stretch-press and each unique part requires an individual set of dies. These types of cord-wise parts derive their cost benefit from the instant invention by their multiple reuse from one model to the next where there is an overlap in size.

Formed spar rails, for example, can be made from a universal tool having the required dimensions to make parts that span from tip cord of the smallest airframe ($tc_1$) to the root cord for the largest airframe ($rc_n$) in the series wherein the subscript $n$ represents the number of specific models in the series. Therefore, the tool to make this type of part must be designed to span from $tc_1$ to . . . $rc_n$ whose exact dimensions are determined by the actual designs for each model in the series.

Machined spar rails, spars and skins are all made on computer-controlled milling machines. The cost benefits of the instant invention requires that the milling head be universal and designed to run from $tc_1$ to $rc_n$ with stops programmed at $tc_2$, $tc_3$ --$tc_n$ and $rc_1$, $rc_2$ and ---$rc_n$. The exact dimensions of which are determined by the actual designs for each model in a series.

Moulded types of cord-wise parts derive their cost benefit from the instant invention through their multiple reuse from one model to another, where applicable, throughout the entire series. The skin and spar molds, however, are universal in nature and span from $tc_1$ to $rc_n$ with stops at $tc_2$, $tc_3$ ---$tc_n$ and $rc_1$, $rc_2$ --- $rc_n$. The exact dimensions of which are determined by the actual designs for each model in a series.

Assembly and mating fixtures must be designed to be universal in nature for use with appropriate locators, to accommodate all the parts for each and every model in the series spanning from $tc_1$ to $rc_n$. The actual dimensions of which are determined by the specific designs for each model in the series.

Once again, there is a feedback loop 73 following steps 70, 71 and 72 as shown on the flow diagram to compensate for incomplete information and errors in prior decisions.

Manufacturing of the Tooling 74 Detail Parts 79 and Assembly of the Airframes 84 for each specific model 75, 76, and 77 and 80, 81 and 82 and 85, 86 and 87 respectively are all accomplished using state-of-the-art factory practices well known to the experienced aircraft technician and do not require further disclosure, i.e., composite material parts and assemblies can be tooled and manufactured by the well-known FIBERITE process as described in their copyrighted 1985 brochures.

Feedback loops 78, 83 and 88 are provided following steps 75, 76 and 77 and 80, 81 and 82 and 85, 86 and 87 respectively as shown on the flow diagram to compensate for incomplete information and prior erroneous decisions.

While the preferred embodiment of the invention has been disclosed, other embodiments may be devised and modifications made within the spirit of the invention and within the scope of the appended claims.

What is claimed is:

1. A method for economically constructing a size-graduated range of airframes characterized by a generally similar profile wherein each of a plurality of airfoils and other sub-assemblies in each of said airframes comprises a plurality of series of size-graduated but otherwise generally identical components and wherein each component $C_{xy}$ is characterized by a basic dimension $D_{xy}$ from which all other measurements of said components can be derived wherein x indicates a size of airframe in said range and y indicates a size of component in said series; which comprises:
   making a set of drawings and calculating a set of manufacturing specifications for constructing at least one primary airframe;
   using said sets of drawings and manufacturing specifications in making at least one subset of drawings and in calculating one subset of manufacturing specifications for constructing a secondary airframe;
   said step of using said sets comprising the step of calculating manufacturing specifications for the minimum number of different sizes of each component $C_{xy}$ which must be used in constructing said primary and secondary airframe;
   constructing broad-ranged molds, mandrels and patterns to produce some of said series of components;
   setting numerically-controlled machines to manufacture some of said series of components; and
   producing kits of said components necessary to construct one of said airframes;
   assembling said kits into said airfoils and other subassembly for said airframe;
   wherein the step of constructing broad-ranged molds, mandrels and patterns comprises fabricating a mandrel sized and dimensioned to shape skin panels of at least one of said airfoils for a plurality of airframes.

2. The method claimed in claim 1 wherein the step of setting numerically-controlled machines comprises:
   making machine readable sets of programming devices to cause said machines to manufacture series of components having common dimensions and size-graduated dimensions.

3. The method claimed in claim 1 wherein the step of manufacturing a mandrel comprises:
   making a plurality of size-graduated form segments; and
   stringing some of said form segments over a central shaft.

4. The method of claim 1, wherein the step of using said sets of drawings and manufacturing specifications comprises:
   calculating the dimensions of airfoil structures for each airframe including forward-swept wings and nose-mounted canards, having planforms, profiles and general arrangement which are scaled versions of one another; and
   the step of constructing broad-ranged molds, mandrels and patterns comprises:
   making tools for said airfoil structures, said tools having variable but overlapping dimensions with stops at points determined by the size of each specific airfoil structure.

5. The method of claim 4, wherein the step of calculating the dimensions of airfoil structures comprises:
   calculating the dimensions of the leading edge, box and trailing edge components of said airfoil structures; and
   the step of making tools comprises:
   making specific tools for fabricating and assembling said series of components for each airframes, said specific tools having fixed and variable elements sized and dimensioned to fabricate some of said series of components for said primary and said secondary airframes.

6. The method of claim 4, wherein the step of calculating the dimensions of airfoil structures comprises:
   calculating the dimensions of leading edge flaps, trailing edge flaps and rudders for said airfoils, said flaps and rudders having planforms, profiles and general arrangements which are scaled versions of one another from model to model.

7. The method of claim 6, wherein the step of calculating the dimensions of various models comprises:
   desiging fuselage structures for each model to fulfill each model purpose.

8. The method of claim 7, wherein the step of calculating the dimensions of fuselage structures comprises:
   calculating the dimensions of a fuselage nose section common to several models.

9. The method of claim 7, wherein the step of calculating the dimensions of fuselage structures comprises:
   calculating the dimensions of center fuselage sections having similar cross-sections but different lengths from airframe to airframe.

10. The method of claim 7, wherein the step of calculating the dimensions of fuselage structures comprises:
    calculating the dimensions of center fuselage sections which are scaled versions of one another from one airframe to another.

11. The method of claim 4, wherein the step of fabricating a set of tools comprises:
    making an airfoil manufacturing tool dimensioned to manufacture size-graduated airfoils from the smallest tip-chord airfoil to the largest root-chord airfoil in said range of airframes.

12. The method of claim 4, wherein the step of calculating the dimensions of airfoil structures comprises:
    calculating the dimensions of longitudinal control surfaces and lateral control surfaces having planforms, profiles and general arrangements which are scaled versions of one another from model to model.

* * * * *